LINEAR CRYSTAL DISCRIMINATOR CIRCUIT

Filed June 2, 1967

3 Sheets-Sheet 1

INVENTOR.
CARL R. HURTIG
BY
Kenway Jenney & Hildreth
ATTORNEYS

LINEAR CRYSTAL DISCRIMINATOR CIRCUIT

Filed June 2, 1967 3 Sheets-Sheet 2

INVENTOR.
CARL R. HURTIG
BY

ATTORNEYS

INVENTOR.
CARL R. HURTIG
BY

ATTORNEYS

United States Patent Office 3,475,690

Patented Oct. 28, 1969

3,475,690
LINEAR CRYSTAL DISCRIMINATOR CIRCUIT

Carl R. Hurtig, Scituate, Mass., assignor to Damon Engineering, Inc., Needham Heights, Mass., a corporation of Massachusetts Filed June 2, 1967, Ser. No. 643,206
Int. Cl. H03k 3/42; H03d 3/26
U.S. Cl. 329—117 5 Claims

ABSTRACT OF THE DISCLOSURE

This application discloses a crystal discriminator circuit including two circuit branches each including a crystal. One crystal has an impedance zero at $\omega_1$, the other at $\omega_2$, where $$\frac{\omega_1+\omega_2}{2}$$

is the center frequency of the carrier. The crystals are connected to the input terminals of the circuit through an impedance inverter (sometimes termed a "gyrator") to present a relatively high input impedance to a signal source. Voltage detecting means are connected to the crystals to produce an output voltage, proportional to the difference between the voltage across the crystals, that is linear in the frequency range between $\omega_1$ and $\omega_2$. The full specification should be consulted for an understanding of the invention.

My invention relates to discriminator circuits, and particularly to a novel linear discriminator circuit for the detection of frequency modulated signals and the like.

Numerous discriminator networks have been devised using one or more piezoelectric crystals as frequency sensitive impedances. The primary advantage of the use of crystals in circuits of this kind is their high frequency stability. However, a number of problems have been encountered in practice in the use of crystal discriminator circuits. In one class of crystal discriminator networks, the crystal is operated in the vicinity of an impedance zero. Operation in this vicinity is desirable, because inharmonic modes of oscillation usually occur closer to the impedance poles than to the impedance zeros. However, as the crystal presents a very low impedance in the vicinity of its impedance zero, prior discriminator circuits that are operated in this manner require constant current sources as input drivers, and frequently require current detectors in the network. These requirements are onerous in practice, although presenting no theoretical difficulties.

Discriminator networks in which crystals are operated in the vicinity of their impedance poles present other problems. At the high impedance levels in the vicinity of the poles, very small changes in distributed capacitance, or other incidental capacitive effects, have a very significant influence on center frequency location and on the linearity of the output. Also, such networks are inherently limited in bandwidth by adjacent inharmonic modes.

It is, therefore, an object of my invention to facilitate the use of a voltage source as the input signal source for a discriminator network, while improving the center frequency stability and maintaining the linearity of the discriminator.

Briefly, the above and other objects of my invention are attained by a novel discriminator network including two branches each including a crystal operating in the vicinity of an impedance zero. In combination with each crystal is a network approximating closely a lossless impedance inverter and serving to make the impedance of the discriminator network, as seen by the driving source, relatively high over the range of frequencies encountered in operation. By this arrangement, most of the advantages of operation at both poles and zeros are retained, while most of the disadvantages of operating in either mode are eliminated.

The manner in which the discriminator circuit of my invention is constructed, and its mode of operation, will best be understood in the light of the following detailed description, together with the accompanying drawings, of a preferred embodiment thereof.

Figure 1:
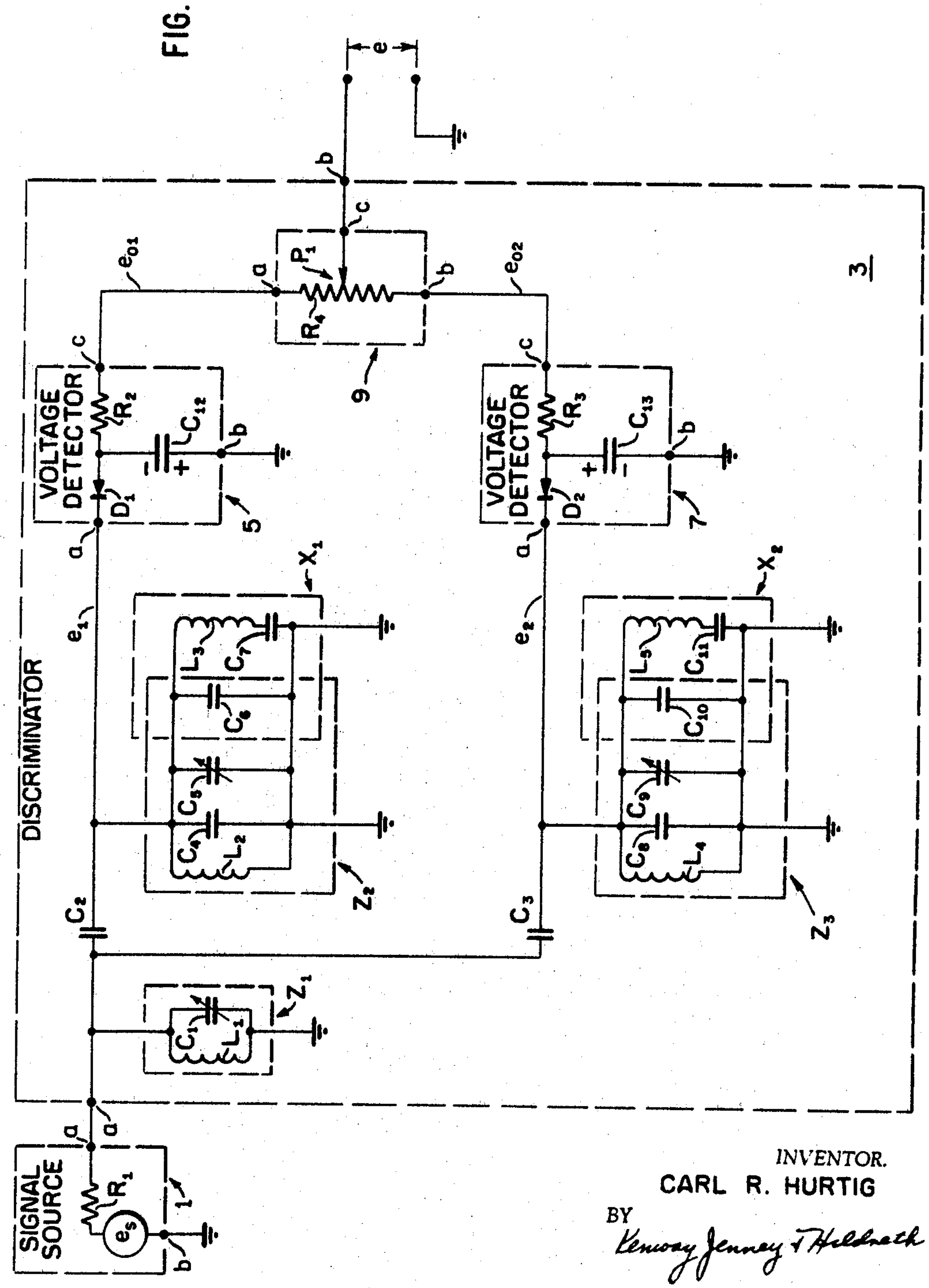
FIG. 1 is a schematic wiring diagram of a crystal discriminator circuit made in accordance with a preferred embodiment of my invention.

In FIG. 1, I have shown a signal source generally indicated at 1 connected to a discriminator 3. The signal source may be any conventional source of radio frequency voltage having a frequency modulated about a center frequency $\omega_0$, such as the output IF amplifier in a conventional FM tuner or the like. The source 1 should have a source impedance R1 sufficiently small with respect to the impedance presented by the discriminator, to be described, that the signal voltage $e_s$ will be substantially unaffected by variations in the impedance presented by the discriminator over its operating range.

The output signal provided by the source 1 and appearing between its output terminal *a* and a grounded terminal *b* is applied to the input terminal *a* of the discriminator 3. Between the input terminal *a* of the discriminator and ground is a first impedance $Z_1$. As shown, this impedance comprises an inductor $L_1$ connected in parallel with a variable capacitor $C_1$. The values of these components are selected in a manner to be described below.

Also connected to input terminal *a* of the discriminator is one terminal of a capacitor $C_2$. The other terminal of the capacitor $C_2$ is returned to ground through an impedance $Z_2$ comprising elements connected in parallel with, and an element forming part of, a crystal $X_1$. The crystal $X_1$ is shown in the form of its equivalent circuit, comprising a series path extending between the terminals of the crystal and including an inductor $L_3$ and a capacitor $C_7$, and a shunt capacitance $C_6$. As shown, the shunt capacitance $C_6$ forming a part of the crystal $X_1$ also forms a part of the impedance $Z_2$. The impedance $Z_2$ includes in parallel with the capacitor $C_6$, a variable capacitance $C_5$, a fixed capacitor $C_4$, and an inductor $L_2$.

The crystal $X_1$ is selected to have an impedance zero at a frequency $\omega_1$ sufficiently above the center frequency $\omega_0$ about which the source is modulated so that it encompasses the upper modulation band. Other components are selected in a manner to be described in detail below.

The voltage across the crystal $X_1$ is sensed by a voltage detector 5 having an input terminal *a* connected to the upper terminal of the crystal $X_1$ and a terminal *b* connected to ground. The voltage detector 5 is preferably a peak detector comprising a diode $D_1$ and a capacitor $C_{12}$ connected in series between terminals *a* and *b* of the detector 5, and a resistor $R_2$ connected between the junction of the diode $D_1$ and the capacitor $C_{12}$ and the output terminal $c$ of the voltage detector 5. It is apparent that the capacitor $C_{12}$ will be charged to the peak negative voltage appearing across the crystal $X_1$ with respect to ground.

A second branch of the discriminator circuit 3 extends from the input terminal $a$ of the discriminator through a capacitor $C_3$ to the input terminal $a$ of a second voltage detector 7. An impedance $Z_3$ and a second crystal $X_2$ are connected between the input terminal $a$ of the voltage detector 7 and ground. As in the branch of the circuit described above, the crystal $X_2$ is shown in the form of its equivalent circuit comprising a series path between its terminals including an inductor $L_5$ and a capacitor $C_{11}$, and a shunt capacitance $C_{10}$. The shunt capacitance $C_{10}$ forming a part of the crystal $X_2$ also forms a part of the impedance $Z_3$. The latter includes, in parallel with the capacitor $C_{10}$, a variable capacitor $C_9$, a fixed capacitor $C_8$, and an inductor $L_4$. The crystal $X_2$ is selected to have an impedance zero at a frequency $\omega_2$ below the frequency $\omega_0$ by an amount equal to the frequency separation between $\omega_1$ and $\omega_0$. The other components are selected in a manner to be described in detail below.

The voltage detector 7 may be the same as the voltage detector 5, except that it is designed to produce a positive output signal. For this purpose, a diode $D_2$ is connected in series with a capacitor $C_{13}$ between input terminal $a$ of the voltage detector 7 and the grounded terminal $b$. The diode $D_2$ is poled so that the capacitor $C_{13}$ will charge on positive-going half cycles of the voltage across the crystal $X_2$ with respect to ground. This voltage is applied through a resistor $R_3$ to the output terminal $c$ of the voltage detector.

The output terminals $c$ of the voltage detectors 5 and 7 are connected to a summing circuit 9, here shown as a potentiometer $P_1$ having a resistive element $R_4$ connected between terminals $a$ and $b$ of the summing circuit. The wiper of the potentiometer $P_1$ is connected to an output terminal $b$ of the discriminator. A voltage $e_0$ that is 0 when the frequency of the input voltage applied to the discriminator is $\omega_0$, that goes positive as the source frequency goes above $\omega_0$, and that goes negative as the source frequency goes below $\omega_0$ will appear between the discriminator output terminal and ground.

Figure 2:
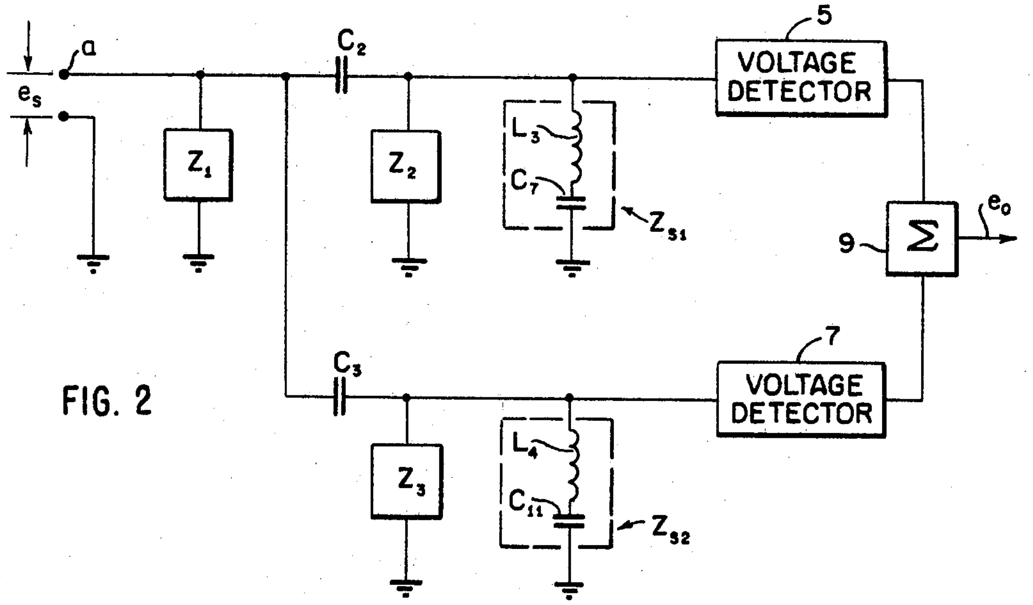
FIG. 2 is a simplified block diagram of the circuit of FIG. 1, emphasizing the relationship between certain groups of components.
Figure 3:
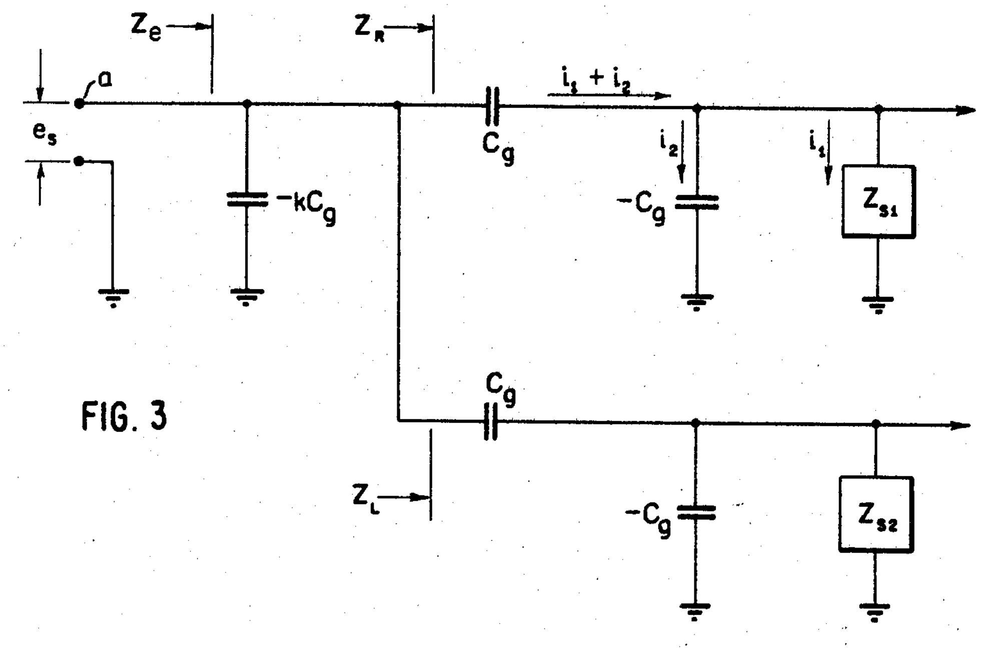
FIG. 3 is a schematic hypothetical wiring diagram useful in explaining the operation of the circuit of FIG. 1.

The manner in which the components of the circuit of FIG. 1 are selected, and the mode of operation of the circuit, will best be understood from FIGS. 2 and 3. FIG. 2 is a simplified diagram of the discriminator in which the complex impedances $Z_1$, $Z_2$ and $Z_3$ are shown in block form, and in which the portions of the crystals $X_1$ and $X_2$ determining the impedance zero are shown as a pair of impedances $Z_{s1}$ and $Z_{s2}$, respectively. FIG. 3 corresponds to FIG. 2 except that the voltage detectors 5 and 7 and the summing circuit 9 have been omitted, on the assumption that the impedance of these circuits to radio frequency signals is so high that they can be ignored for purposes of explanation of the operation of the remainder of the circuit. Also, in FIG. 3 the values of the impedances $Z_1$, $Z_2$ and $Z_3$, and the capacitors $C_2$ and $C_3$, have been replaced by hypothetical values. Specifically, the impedance $Z_1$ has been replaced by a hypothetical capacitor having a negative capacitance $-kC_g$, capacitors $C_2$ and $C_3$ have each been replaced by capacitances having capacitances $C_g$, and the impedances $Z_2$ and $Z_3$ have each been replaced by hypothetical negative capacitances $-C_g$. As will appear, the hypothetical negative capacitances can be accurately approximated by real impedances over the range of operation, and they are merely adopted for expository purposes.

In FIG. 3, the impedance $Z_C$ between input terminal $a$ of the discriminator and ground, in terms of the impedance $$\frac{j}{k\omega Cg}$$

of the hypothetical negative capacitor, the impedance $Z_R$ of the components $+C_g$, $-C_g$ and $Z_{s1}$ of the upper branch of the discriminator, and the impedance $Z_L$ of the corresponding components of the lower branch of the circuit of FIG. 3, is as follows:

$$Z_e=\frac{\left(\frac{j}{k\omega C_g}\right)Z_RZ_L}{\left(\frac{j}{k\omega Cg}\right)(Z_R+Z_L)+Z_RZ_L} \tag{1}$$

Rearranging, Equation 1 becomes:

$$Z_e=\frac{Z_RZ_L}{Z_R+Z_L+\frac{k\omega C_g}{j}Z_RZ_L}$$

or $$Z_e=\frac{1}{\frac{1}{Z_L}\frac{1}{Z_R}+\frac{k\omega C_g}{j}} \tag{1a}$$

It can be shown that $$Z_R=\frac{-j}{\omega C_g}+\frac{\frac{jZ_{s1}}{\omega C_g}}{Z_{s1}+\frac{j}{\omega C_g}} \tag{2}$$

Rearranging;

$$Z_R=\frac{\frac{-jZ_{s1}}{\omega C_g}+\frac{1}{\omega^2C_g^2}+\frac{jZ_{s1}}{\omega C_g}}{Z_{s1}+\frac{j}{\omega C_g}}=\frac{1}{\omega^2C_g^2\left(Z_{s1}+\frac{j}{\omega C_g}\right)}$$

then, $$\frac{1}{Z_R}=\omega^2C_g^2\left(Z_{s1}+\frac{j}{\omega C_g}\right) \tag{3}$$

by symmetry, $$\frac{1}{Z_L}=\omega^2C_g^2\left(Z_{s2}+\frac{j}{\omega C_g}\right) \tag{4}$$

Substituting Equations 3 and 4 in Equation 1$a$, and rearranging, $$Z_e=\frac{1}{-\omega kC_g+2j\omega C_g+\omega^2C_g^2(Z_{s1}+Z_{s2})} \tag{5}$$

if $k=2$, and defining $$X_g\triangleq\frac{1}{\omega_0^2C_g^2}$$

$$Z_e=\frac{X_g^2}{Z_{s1}+Z_{s2}} \tag{6}$$

Thus, the impedance of the network is inversely proportional to the sum of the series impedances of the two crystals. Since both crystals are operated near series resonance, it is correspondingly high. Since the modulation bandwidth is commonly quite small with respect to the center frequency $\omega_0$, the value of $X_g$ can be assumed to be constant over the range of operating frequencies.

It will be apparent from Equation 6 that the network of FIG. 3 effectively inverts the series impedances $Z_{s1}$ and $Z_{s2}$ of the crystals $X_1$ and $X_2$, respectively. Thus, when the crystals are operated near their impedance zeros, the impedance seen by the input voltage source is high. Therefore, the assumption that the networks do not appreciably load the source is realizable in practice. On the assumption that the networks do not appreciably load the source, either branch of the discriminator network can be considered independently of the other. That is because the current drawn by one branch will not affect the input voltage seen by the other branch. Thus, the upper branch of the network in FIG. 3 could be considered with the lower branch removed, or vice versa, by changing the value of capacitance $-kC_g=-2C_g$ to $-C_g$. For either branch, the impedance $Z_{s1}$ or $Z_{s2}$ can, therefore, be considered as connected to the input circuit through a "gyrator," or hypothetical impedance inverter. A real circuit cannot be made to approximate the equivalent circuit of a gyrator over a wide range of frequencies. However, as will appear, the circuit of FIG. 1 can be made to closely approximate the gyrator network of FIG. 3 over the narrow range of frequencies needed for a discriminator network. Because the description of the properties of the circuit is simpler when considered in terms of the gyrator concept, it will be retained for the purpose of describing certain additional properties of the circuit of my invention. I will then describe the manner in which the components of FIG. 1 can be selected so that, in the frequency range of interest, the network will behave as though the crystals were connected to the input voltage source through lossless impedance inverters.

Substituting the actual values.

$$j\omega L_3-\frac{j}{\omega C_7}$$

and $$j\omega L_5-\frac{j}{\omega C_{11}}$$

for the impedances $Z_{s1}$ and $Z_{s2}$, respectively, in Equation 6, it can be shown that (7) $$Z_e=\frac{X_g^2}{j(C_7+C_{11})}\left[\omega^2\left(\frac{C_7C_{11}}{C_7+C_{11}}\right)(L_3+L_5)-1\right]$$

There will evidently be an impedance pole at a frequency $\omega_0$ given by (8) $$\omega_0^2=\frac{1}{(L_3+L_5)\left(\frac{C_7C_{11}}{C_7+C_{11}}\right)}$$

The series resonant frequencies $\omega_1$ and $\omega_2$ of the crystals $X_1$ and $X_2$ are given by (9) $$\omega_1^2=(\omega_0+\Delta\omega)^2=\frac{1}{L_3C_7}$$

(10) $$\omega_2=(\omega_0-\Delta\omega)^2=\frac{1}{L_5C_{11}}$$

Since $C_{11}\cong C_7$

(11) $$\frac{L_5}{L_3}=\left(\frac{\omega_0+\Delta\omega}{\omega_0-\Delta\omega}\right)^2$$

if $\Delta\omega\ll\omega_0$

(12) $$\frac{L_5}{L_3}\cong 1+\frac{4\Delta\omega}{\omega_0}$$

Referring now to FIG. 3, the transfer function of the two branches of the discriminator circuit will next be considered. Since the source is assumed not to be affected by the load, the following steady state equations will hold:

(13) $$i_1Z_{s1}+(i_1+i_2)\left(\frac{-j}{C_g}\right)=e_s$$

and

(14) $$i_1Z_{s1}=\frac{i_2 j}{C_g}$$

where $i_1$ is the current through $Z_{s1}$, and $i_2$ is the current through the hypothetical negative capacitance $-C_g$. Substituting Equation 14 into Equation 13 to eliminate $i_2$, there is obtained

(15) $$e_s=(i_1-ji_1Z_{s1}\omega C_g)\left(\frac{j}{\omega C_g}\right)+i_1Z_{s1}$$

Rearranging;

$$e_s=i_1\left[\frac{-j}{C_g}-Z_{s1}+Z_{s1}\right]=\frac{-ji_1}{\omega C_g}$$

(16) $$i_1=j\omega C_g e_s$$

The output voltage $e_1$ is then given by

(17) $$e_1=i_1Z_{s1}=j\omega C_g e_s Z_{s1}$$

substituting;

$$\omega L_3-\frac{j}{\omega C_g}$$

for $Z_{s1}$

(18) $$e_1-\frac{-C_g e_s}{C_7}(\omega^2L_3C_7-1)$$

at a frequency $\omega_0+\Delta\omega$ between $\omega_1$ and $\omega_2$, $$e_1=\frac{-C_g}{C_7}e_s(\omega_0+\Delta\omega)^2L_3C_7-1$$

(19) $$e_1=\frac{-C_g e_s\omega_0^2}{C_7}\left[\left(1+\frac{2\Delta\omega}{\omega_0}+\frac{\Delta\omega^2}{\omega_0^2}\right)L_3C_7-1\right]$$

ignoring the small term $$\left(\frac{\Delta\omega}{\omega_0}\right)^2$$

(19*a*) $$e_1\cong\frac{-C_g e_s\omega_0^2}{C_7}\left[\left(1+\frac{2\Delta\omega}{\omega_0}\right)L_3C_7-1\right]$$

evidently Equation 19*a* can be written in the form

(20) $$e_1=k_2\Delta\omega+k_3$$

where $k_2$ and $k_3$ are the constant terms in Equation 19*a*, and the output voltage $E_1$ is linear in the frequency deviation about $\omega_0$.

By the same reasoning, it can be shown that the output voltage $e_2$ from the lower branch of the discriminator circuit of FIG. 3 is given by

(21) $$e_2=\frac{-C_g e_s}{C_{11}}(\omega^2L_5C_{11}-1)$$

This equation can also be written in the form

(22) $$e_2=k_4\Delta\omega+k_5$$

by the process used above in deriving Equation 20, where $k_4$ and $k_5$ are constants.

Figure 4:
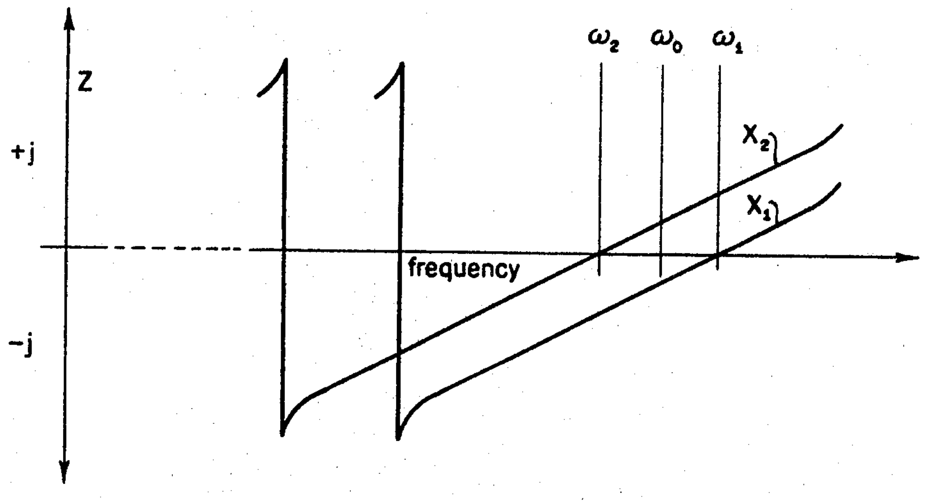
FIG. 4 is a graph of impedance versus frequency for the two crystals employed in the cricuit of FIG. 1.

FIG. 4 is a graph of the impedances of the crystals $X_1$ and $X_2$ as a function of angular frequency. Comparing FIG. 4 and Equation 18, apparently the voltage $e_1$ will be 0 at $\omega_1$, the impedance zero of the crystal $X_1$. As the frequency is decreased from $\omega_1$ toward $\omega_2$, the series impedance of the crystal $X_1$ will increase and $e_1$ will also increase in the linear manner illustrated by Equation 19*a*. Referring now to FIG. 1, the voltage $e_1$ is applied to input terminal *a* of the voltage detector 5, to produce a negative DC output voltage $e_{01}$ that increases from 0 at $\omega_1$ to a maximum (in the region of interest) at $\omega_2$. By similar considerations, it will be apparent that the voltage $e_2$ applied to the input terminal *a* of the detector 7 will produce a positive DC output voltage $e_{02}$ that increases from 0 at $\omega_2$ to a maximum at $\omega_1$.

Comparing Equations 18 and 21, it will be apparent that the equations for $e_1$ and $e_2$ differ only in the differences between the L and C constants. Since in practice these constants would not be greatly different, as the difference between $\omega_1$ and $\omega_2$ is small compared to $\omega_0$, the sum $e_{01}+e_{02}$ will be nearly zero at $\omega_0$. Thus, the output voltage $e_0$ at the wiper of the potentiometer $P_1$, when the latter is centrally positioned and the resistors $R_2$ and $R_3$ are equal, will be proportional to $e_{01}+e_{02}$ and nearly zero at $\omega_0$. A slight adjustment of the wiper will make the output voltage exactly 0 at $\omega_0$, as shown in FIG. 5.

Figure 5:
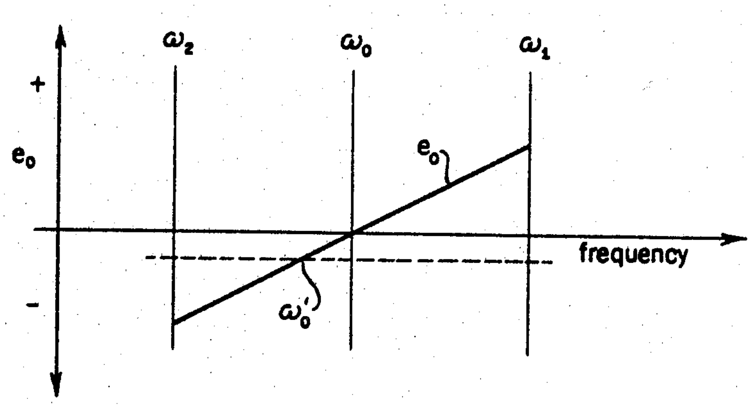
FIG. 5 is a graph of output voltage versus frequency characteristic of the operation of the circuit of FIG. 1.

Further adjustment of the potentiometer results in a shift of the null point; for example, to produce a null at $\omega_0$ as indicated in FIG. 5. This adjustment makes it possible to adjust the center frequency of the discriminator without disturbing linearity, so that variations in component values encountered in practice are more readily accommodated without loss of performance quality, and the center frequency of the circuit can be set more closely to the desired carrier frequency than would be practical merely by the careful selection of components.

Selection of the actual values of the components in FIG. 1 to produce the mode of operation described with respect to the hypothetical circuit of FIG. 3 will next be considered. The voltage detectors 5 and 7 and the summing circuit 9 can be of any conventional construction. Knowing the desired center frequency $\omega_0$ and the modulation bandwidth, the crystals $X_1$ and $X_2$ are selected to have poles at $\omega_1$ and $\omega_2$ sufficiently away from $\omega_0$ to accommodate the modulation with some provision for adjustment. Selection of the crystals fixes the values of $L_3$, $C_6$, $C_7$, $L_5$, $C_{11}$ and $C_{10}$. The necessary values of the other components are then calculated in the manner next to be described.

The inductor $L_1$ and the mid-range capacitance of the capacitor $C_1$ are selected so that their equivalent impedance at $\omega_0$ is that of the hypothetical negative capacitance $-2C_g$. Thus, $$\frac{-j\omega_0 L_1}{\omega_0^2 L_1 C_1 - 1} = \frac{j}{2\omega_0 C_g} \tag{23}$$

$$L_1(C_1 + 2C_g) = \frac{1}{\omega_0^2} \tag{24}$$

Any convenient values satisfying Equation 24, may be selected by conventional design procedure. For example, for center frequencies in the vicinity of 30 mcs., $C_g$ might be taken as 18 picofarads and $L_1$ chosen to be 0.5 microhenry. $C_1$ would then be given by $$.5\times 10^{-6}(C_1 + 36\times 10^{-12}) = \frac{1}{3.6\times 10^{-16}}$$

$$C_1 \cong 20 \text{ pf.}$$

The values of $C_6$ and $C_{10}$ are fixed when the crystals are selected. The other components of the impedances $Z_2$ and $Z_3$ are then selected so that $Z_2$ and $Z_3$ each have the value $$\frac{j}{\omega_0 C_g}$$

at $\omega_0$. Thus, $$Z_2 = \frac{-j\omega_0 L_2}{\omega_0^2 L_2 (C_4 + C_5 + C_6) - 1} = \frac{j}{\omega_0 C_g} \tag{25}$$

or $$L_2(C_4 + C_5 + C_6 + C_g) = \frac{1}{\omega_2^2} \tag{26}$$

Similarly, $$L_4(C_8 + C_9 + C_{10} + C_g) = \frac{1}{\omega_0^2} \tag{27}$$

The components may be any convenient values that satisfy Equations 26 and 27 and meet other conventional design criteria. Since the capacitors $C_1$, $C_5$ and $C_9$ are adjustable, reasonable tolerances in the values of the fixed components can be allowed.

It will be apparent that the impedances $Z_1$, $Z_2$ and $Z_3$ will vary somewhat from their values at $\omega_0$ during operation. However, these variations can be ignored for practical values of center frequency and modulation bandwidth.

It will be apparent that when the circuit of FIG. 1 is constructed as just described, the input source will see the crystals $X_1$ and $X_2$ as though connected to the crystals through parallel impedance inverters. The output voltage from the detectors will be summed to produce an output voltage $C_0$ that is linear in the input frequency. The output voltage can be adjusted to have a null at $\omega_0$, or somewhat above or below $\omega_0$, without loss of linearity. In practice, the range of linear operation will be somewhat less than the full range from $\omega_1$ to $\omega_2$ indicated in the idealized graph of FIG. 5. However, a substantial region of linear operation within this range can be obtained.

While I have described my invention with respect to the details of a preferred embodiment thereof, many changes and variations will occur to those skilled in the art upon reading my description, and such can obviously be made without departing from the scope of my invention.

Having thus described my invention, what I claim is:

1. A linear crystal discriminator circuit for a carrier having a center frequency $\omega_0$ modulated in frequency by an amount less than $\Delta\omega$ between two extremes $\omega_0+\Delta\omega=\omega_1$ and $\omega_0-\Delta\omega=\omega_2$, said circuit comprising, first and second input terminals adapted to be excited by the frequency modulated carrier, a first impedance connected between said terminals and having an impedance $j/2\omega_0 C_g$ at $\omega_0$, where $C_g$ is a constant, third and fourth terminals, a first capacitor connected between said first and third terminals, a second capacitor connected between said first and fourth terminals, each of said capacitors having a capacitance $C_g$, a first crystal having an impedance zero at $\omega_1$ connected between said third terminal and said second terminal, a second impedance connected in parallel with said first crystal and having an impedance in combination with the shunt capacitance of said first crystal equal to $j/\omega_0 C_g$ at $\omega_0$, a second crystal connected between said fourth terminal and said second terminal and having an impedance zero at $\omega_2$, a third impedance connected in parallel with said second crystal and having an impedance in combination with the shunt impedance of said crystal equal to $j/\omega_0 C_g$ at $\omega_0$, and voltage detecting means connected to said third and fourth terminals for producing an output voltage proportional to the difference between the voltages across said crystals.

2. The circuit of claim 1, in which said voltage detecting means comprises a first peak detector comprising a first diode and a third capacitor connected in series between said third terminal and said second terminal, a second peak detector comprising a second diode and a fourth capacitor connected between said fourth terminal and said second terminal, said diode being poled oppositely with respect to said second terminal to charge to opposite polarities in response to alternating voltage across said crystals, and summing means connected to said capacitors to produce an output DC voltage having a sign determined by the sign of the departure of the input frequency from $\omega_0$ and a magnitude proportional to the magnitude of said departure.

3. The circuit of claim 2, in which said summing means comprises an adjustable potential divider connected between the junction of said first diode and third capacitor and the junction of said second diode and said fourth capacitor, whereby the frequency at which said output voltage charges sign can be adjusted.

4. A crystal discriminator, comprising two crystals having impedance zeros at frequencies $\omega_1$ and $\omega_2$ differing by an amount $\omega_1-\omega_2$ that is small compared to the intermediate frequency $$\frac{\omega_1+\omega_2}{2}$$

a pair of input terminals adapted to be excited by a voltage modulated in frequency in the range $\omega_1$ to $\omega_2$, an impedance inverter connecting said crystals in parallel across said input terminals, and means responsive to the difference in amplitudes between the voltages across said crystals for producing an output signal in accordance with said difference.

5. A crystal discriminator circuit, comprising a pair of input terminals adapted to be excited by a voltage modulated in frequency about a center frequency $\omega_0$, and circuit comprising first, second and third impedances connected in parallel across said terminals, said first impedance having the value $j/2\omega_0 C_g$ at $\omega_0$, where $C_g$ is a constant, said second and third impedances each comprising a capacitor having a capacitance $C_g$ connected in series with a fourth impedance, one of said fourth impedances comprising a first crystal having an impedance zero, a frequency $\omega_1$ above $\omega_0$ and a fifth impedance connected in parallel with said first crystal, said fifth impedance having a value in combination with the shunt impedance of said first crystal equal to $j/2\omega_0 C_g$ at $\omega_0$, the other of said fourth impedances comprising a second crystal having an impedance zero at a frequency $\omega_2$ below $\omega_0$ and a sixth impedance connected in parallel with said second crystal, said sixth impedance having a value in combination with the shunt capacitance of said second crystal equal to $j/\omega_0 C_g$ at $\omega_0$, and voltage detecting means connected to said crystals for producing an output signal in accordance with the difference between the voltages across said crystals.

References Cited

UNITED STATES PATENTS

| | | | |
|---|---|---|---|
| 2,889,458 | 6/1959 | Baum | 329—140 X |
| 3,061,786 | 10/1962 | Theriautt | 333—80 X |
| 3,170,121 | 2/1965 | Ho et al. | 329—117 |
| 3,199,040 | 8/1965 | Coogan | 329—141 X |
| 3,219,952 | 11/1965 | Saraga | 333—80 |

ALFRED L. BRODY, Primary Examiner

U.S. Cl. X.R.

307—232; 325—349; 329—140; 333—80